US007137294B2

(12) United States Patent
Eser et al.

(10) Patent No.: US 7,137,294 B2
(45) Date of Patent: Nov. 21, 2006

(54) DEVICE AND METHOD FOR IDENTIFYING DEFECTS IN A FUEL INJECTION SYSTEM

(75) Inventors: Gerhard Eser, Hemau (DE); Frank Widmann, Heilbronn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/539,929

(22) PCT Filed: Oct. 9, 2003

(86) PCT No.: PCT/DE03/03347

§ 371 (c)(1),
(2), (4) Date: Jun. 17, 2005

(87) PCT Pub. No.: WO2004/057172

PCT Pub. Date: Jul. 8, 2004

(65) Prior Publication Data

US 2006/0144130 A1 Jul. 6, 2006

(30) Foreign Application Priority Data

Dec. 19, 2002 (DE) ............................... 102 59 797

(51) Int. Cl.
*G01M 15/00* (2006.01)

(52) U.S. Cl. .................................................... 73/119 A

(58) Field of Classification Search ................. 73/49.7, 73/116, 117.2, 117.3, 118.1, 119 A, 119 R
See application file for complete search history.

(56) References Cited

U.S. PATENT DOCUMENTS

| | | | |
|---|---|---|---|
| 5,727,515 A | 3/1998 | Biester | |
| 6,240,772 B1 | 6/2001 | Thomas | |
| 6,474,292 B1 | 11/2002 | Frenz et al. | |
| 2006/0150723 A1* | 7/2006 | Delp et al. ................ | 73/119 A |

FOREIGN PATENT DOCUMENTS

| | | |
|---|---|---|
| DE | 198 45 524 A1 | 4/2000 |
| DE | 199 50 222 A1 | 4/2001 |
| DE | 199 46 506 C1 | 7/2001 |
| JP | 11002148 | 1/1999 |
| WO | WO 95/06814 | 3/1995 |
| WO | WO 01/83971 | 11/2001 |

* cited by examiner

*Primary Examiner*—Eric S. McCall

(57) ABSTRACT

The invention makes the identification of defects possible in a fuel injection system comprising a fuel accumulator, a continuously operating high-pressure pump and a fuel pressure control valve. By evaluating the high-frequency portion of the fuel pressure course in the fuel accumulator, it can be indicated with a high probability which of the components are defective whereby this is assisted, in particular, by additional evaluations performed during a diagnostic method.

10 Claims, 4 Drawing Sheets

DEVICE AND METHOD FOR IDENTIFYING DEFECTS IN A FUEL INJECTION SYSTEM

CROSS REFERENCE TO RELATED APPLICATION

This application is the U.S. National Stage of International Application No. PCT/DE2003/003347, filed Oct. 9, 2003 and claims the benefit thereof. The International Application claims the benefits of German Patent application No. 10259797.9 DE filed Dec. 19, 2002, both of the applications are incorporated by reference herein in their entirety.

FIELD OF THE INVENTION

The invention relates to a device for identifying defects in a fuel injection system in which the fuel injection system includes at least one high-pressure pump, at least one fuel accumulator, at least one fuel pressure control valve and at least one pressure sensor for recording the pressure prevailing in at least one fuel accumulator.

BACKGROUND OF THE INVENTION

Furthermore, the invention also relates to a method for identifying defects in a fuel injection system, with the fuel injection system including at least one high-pressure pump, at least one fuel accumulator, at least one fuel pressure control valve and at least one pressure sensor for recording the pressure prevailing in at least one fuel accumulator.

In addition, the invention relates to a vehicle with a device for identifying defects in a fuel injection system as well as a diagnostic unit with a device for identifying defects in a fuel injection system.

Fuel injection systems which are within the framework of this publication serve as the high-pressure injection of fuel into the cylinders of an internal combustion engine.

Such a fuel injection system may be equipped with a fuel accumulator which is filled with fuel using a high-pressure pump and is in this case brought to a pressure level required for the high-pressure injection. Fuel is fed to the high-pressure pump itself using a low-pressure fuel pump; said fuel drawn out of a fuel tank using a low-pressure fuel pump. Different measures can be taken in order to control or regulate the fuel injection system. Both mechanical regulators in the low-pressure area and control valves in the high-pressure area are known.

The latter is, in particular, of importance in connection with continuously operating high-pressure fuel pumps which feed the fuel into the fuel accumulator (the “rail”). Such fuel pressure control valves can be adjusted via a magnetic force which can be specified electrically.

Therefore, by and large, complex systems are being dealt with here in which different defects may occur. The fact that there is a defect can be seen in particular in a lower fuel pressure in the fuel accumulator—however, it is not possible to exactly locate the cause of defects only on the basis of this pressure which has been identified as being too low.

A method and a device for monitoring a fuel metering system of an internal combustion engine in which an output signal of a pressure sensor, which records the pressure in a fuel accumulator is filtered using a bandpass filter, is known from WO 01/83971. The bandpass filter is embodied in such a way that it filters out frequencies which correspond to the pump revolutions or integer multiples of the pump rotational speed. If the filtered output signal exceeds a threshold value then it is identified that there is a defect in a high-pressure pump or a pressure control valve.

SUMMARY OF THE INVENTION

It is the object of the invention to develop a device and a method for identifying defects in a fuel injection system with which the source of a defect can be located in a fuel injection system in a cost-effective manner.

This object of the invention is achieved by the features of the independent claims. Advantageous embodiments and further developments of the invention are obtained from the dependent claims.

The outstanding feature of the invention is a method and a corresponding device for identifying defects in a fuel injection system. The fuel injection system includes at least one high-pressure pump, at least one fuel accumulator, at least one fuel pressure control valve and at least one pressure sensor for recording the pressure prevailing in at least one fuel accumulator. The occurrence of at least one defect in the fuel injection system can be identified by recording a pressure in the fuel accumulator which is too low and that a high-frequency component of a first signal characterizing the pressure course in the fuel accumulator over time can be used in order to isolate the source of the defect.

The high-frequency component of the fuel pressure course in the fuel accumulator over time correlates with the possible source of the defects. Therefore, by filtering out said high-frequency component it can be indicated with a high probability that the source of the defects be determined, so that should there be a defect on repairing the fuel injection systems, the components can specifically be exchanged or repaired.

The pressure determined in at least one fuel accumulator can be compared with a desired pressure or a pressure that is actually present in a low-pressure area of the fuel injection system. It is concluded that that there is a defect in the low-pressure area if the pressure determined in at least one fuel accumulator is lower than the desired pressure, or it is concluded that there is a defect in the drive of the high-pressure pump if the pressure determined in at least one fuel accumulator is lower than the pressure that is actually present in the low-pressure area.

If the pressure in the fuel accumulator is lower than the pressure in the low-pressure area available at the same point in time, it is very probable that this is due to the fact that the drive of the high-pressure pump is defective. However, in this case the high-pressure pump equipped with a membrane actually functions as a throttle so that there is a lower pressure on the outlet side of the high-pressure pump than on the inlet side of said pump. However, it is likewise recommended that the pressure determined in the fuel accumulator be compared with the desired pressure in the low-pressure area. Particularly in the case of a pressure in the fuel accumulator which is considerably lower than the desired pressure in the low-pressure area, it is probable that there is a defect in the low-pressure area.

The method according to the invention can in a particularly advantageous way be developed further as a result of the fact that the first signal is lowpass-filtered so that a lowpass-filtered second signal is generated, that a third signal is generated as the absolute difference between the first signal and the second signal and that the third signal is compared with a predefined threshold value in which case, depending on the comparison, the source of the defect is isolated. Therefore, the pressure course over time is then first of all lowpass-filtered. By forming the difference and its absolute value between this lowpass-filtered signal and the original signal, an additional third signal is obtained whose amplitude has an absolute validity so that this can be compared with a predefined threshold value.

According to a further advantageous embodiment of the invention, it is concluded that there is a defect in at least one high-pressure pump if the third signal, essentially, particularly under a high load, exceeds the predefined threshold value. Because in the case of a defect of the high-pressure pump, particularly under a high load, there in general are strong high-frequency components in the pressure course in the fuel accumulator over time, it is possible in the case of suitably predefined threshold values to conclude that there is a defect in the high-pressure pump if the third signal exceeds this threshold value.

According to a further advantageous embodiment of the invention, it is concluded that there is a defect in at least one fuel pressure control valve if the third signal, essentially falls below the predefined threshold value. The pressure loss in the rail, in the case of high-frequency components with low amplitude, most probably has its origin in other components in the high-pressure cycle, i.e. most probably in a defective fuel pressure control valve.

According to a further advantageous embodiment of the invention, the pressure determined in at least one fuel accumulator is evaluated for plausibility on the basis of a value measured by a lambda probe arranged in the exhaust gas flow of an internal combustion engine assigned to a fuel injection pump and, it is concluded that there is a defect in at least one pressure sensor if the plausibility check is negative. Therefore, as soon as the fuel pressure sensor records that the pressure or the pressure in the fuel accumulator present in the low-pressure area of the fuel injection system is too low, a test is then carried out by means of a cross-plausibility check by including the information supplied by the lambda probe to determine whether or not the fuel pressure sensor is defective. The background to this is that a strong pressure loss in the fuel accumulator has a direct influence on the mixture formation and therefore on the exhaust gas values determined by the lambda probe. Therefore, in the case of exhaust gas values within predefined boundaries and a pressure loss reported nevertheless in the rail it is highly probable that the fuel sensor is defective and in particular has a mechanical defect.

It is particularly advantageous for at least one electronic control unit allocated to the fuel injection system to be provided, in which at least one of the said evaluations can be preformed. In particular, the different threshold value comparisons as well as filtering and the formation of differences can take place on a digital basis in the electronic control unit of the fuel injection system. However, it is also feasible, on the other hand, that parts of the evaluation can be implemented by analog switching methods. In addition, parts of the said evaluations can be carried out in other control units of a motor vehicle or another device in which case communication via a data bus is in particular possible between these components and the control of the fuel injection system.

Within this context it is advantageous if the device is embodied in such a way that it has an interface so that it can be installed in a motor vehicle. Therefore, the identification of defects can be carried out in the motor vehicle itself. Identified defects can be stored in a defect memory.

However additional or alternative provision can be made for the device to feature an interface so that it can be installed in a diagnostic unit; said unit being separate from the motor vehicle. Therefore, the device can also be used in a workshop within the framework of vehicle diagnostics.

In addition, the invention relates to a motor vehicle with a device for identifying defects in the fuel injection system.

The invention also relates to a diagnostic unit with a device for identifying defects in the fuel injection system.

The invention is based on the knowledge that a far-reaching diagnosis of a fuel injection system can be undertaken on the basis of measured values which are available at any time. It is, in particular, possible to conclude that there is either a mechanical defect in the high-pressure pump or a mechanical defect in the fuel pressure control valve on the basis of the high-frequency components of the pressure course in the fuel accumulator. Therefore, in case of defects it is possible to specifically exchange or repair the defective components without the requirement of having to take further diagnostic steps.

BRIEF DESCRIPTION OF THE DRAWINGS

The invention is described in more detail with reference to the drawings and on the basis of the preferred embodiments.

They are as follows.

DETAILED DESCRIPTION OF THE INVENTION

Figure 1:
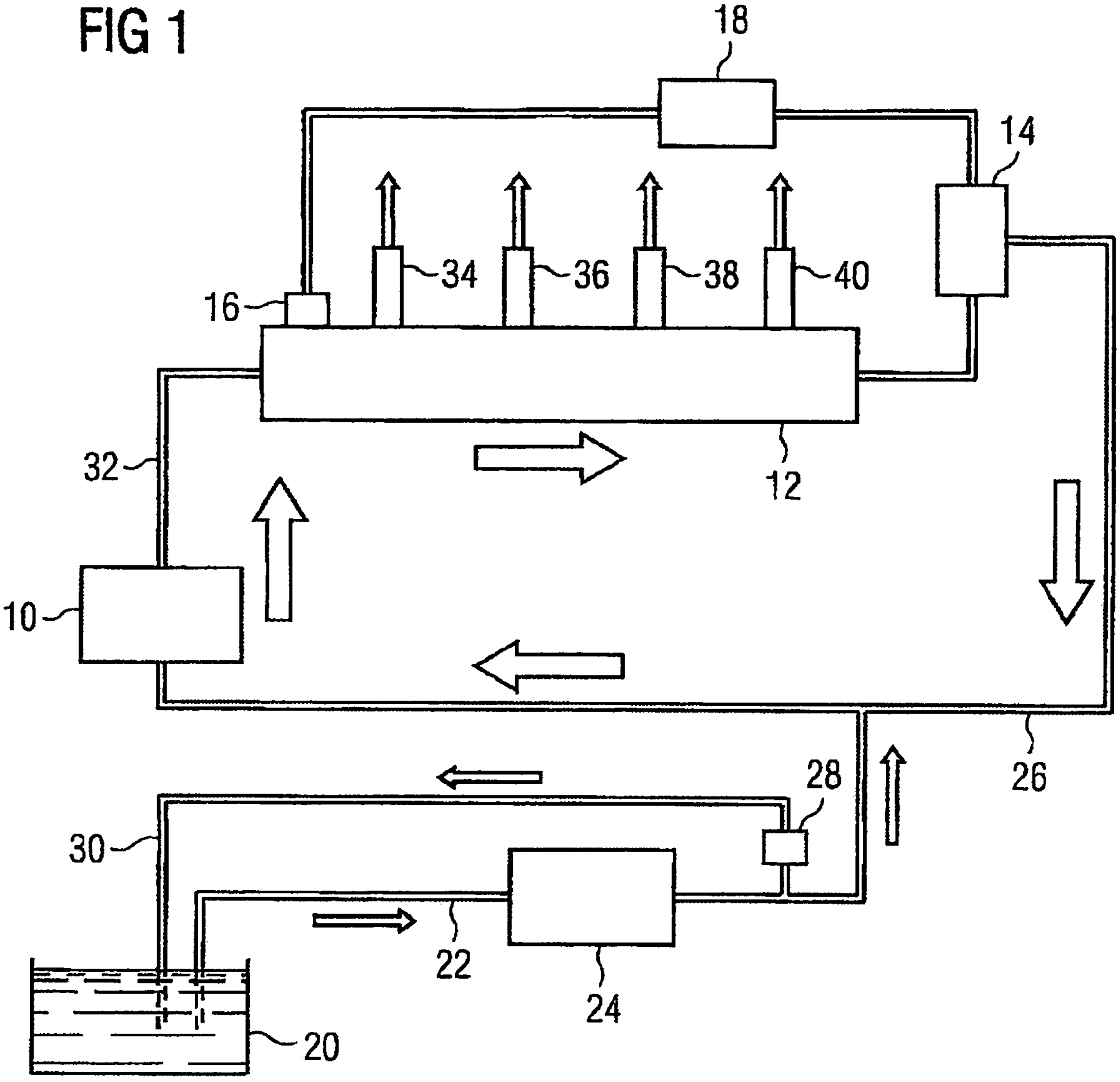
FIG. 1 a schematic diagram of a fuel injection system.
Figure 2:
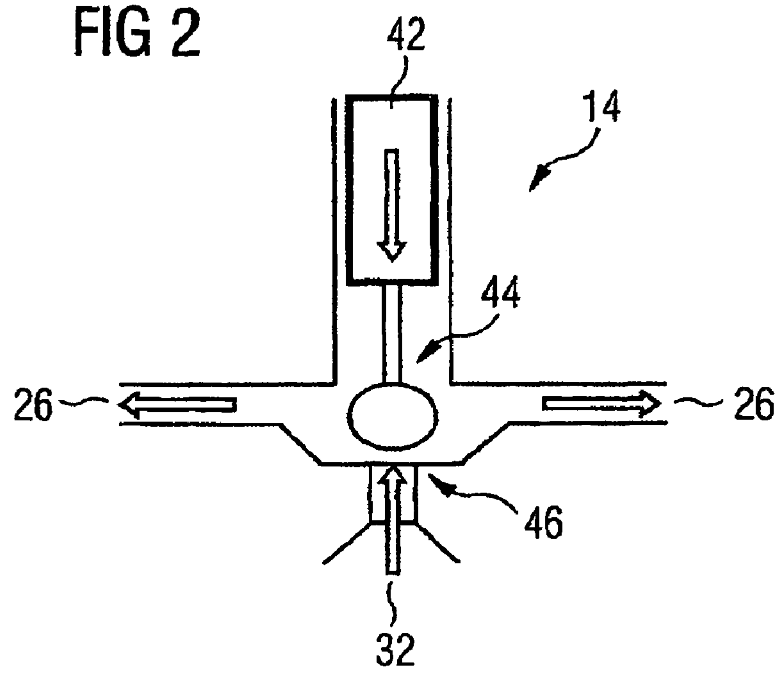
FIG. 2 a schematic cross-sectional diagram of a fuel pressure control valve.

FIG. 1 shows a schematic diagram of a fuel injection system. Fuel is fed from a fuel tank 20 via a fuel line 22 using a low-pressure pump 24. The low-pressure pump 24 supplies fuel to a low-pressure cycle 26. The pressure in this low-pressure cycle 26 is adjusted by using a mechanical low-pressure control device 28 which is in the position to return the fuel to the fuel tank 20 via a fuel line 30. The fuel reaches a high-pressure pump 10 from the low-pressure pump 24 via the low-pressure cycle 26 with a basic admission pressure. This high-pressure pump 10 feeds the fuel in a high-pressure cycle 32 and particularly in a fuel accumulator 12. The fuel accumulator 12 is equipped with injectors or injection valves 34, 36, 38, 40 which can inject the fuel into the cylinder chamber. Because the high-pressure pump 22 operates continuously, a desired pressure adjustment must be provided elsewhere in the fuel accumulator 12. This takes place by means of a fuel pressure control valve 14 via which the difference between the fuel fed by the high-pressure pump 12 and the fuel in the low-pressure cycle 26 injected into the cylinders by the injection valves flows off in the low-pressure cycle 26. The fuel pressure control valve 14 described in greater detail in connection with FIG. 2 is activated by an electronic control 18 which (in addition to others) as an input value receives a value determined by a pressure sensor 16 arranged on the fuel accumulator 12. Therefore, the injection pressure can be regulated due to the fact that the fuel pressure control valve 14 more or less allows fuel to flow into the low-pressure cycle 26, depending on the activation by the electronic control 18.

FIG. 2 shows a schematic cross-sectional diagram of a fuel pressure control valve. The fuel pressure control valve 14 includes a (not shown) magnetic coil which exerts a force onto an armature 42. The armature 42 is connected permanently to a valve tappet 44 which depending on the position of the armature 42 more or less creates an opening 46 to the low-pressure cycle 26. Therefore, depending on the flow of current through the magnetic coil, it is possible that on the basis of the magnetic force and the counterforce of the inrushing fuel from the high-pressure cycle 32 onto the valve tappet 44, an equilibrium is obtained depending on the flow of current through the magnetic coil. The magnetic force is preferably generated by a pulse-width modulated voltage, so that the basic pulse duty ratio of the coil voltage forms the basis for adjusting the pressure in the fuel accumulator 12. In this case, a linear characteristic between the hydraulic force and the magnetic force is especially implemented.

Figure 3:
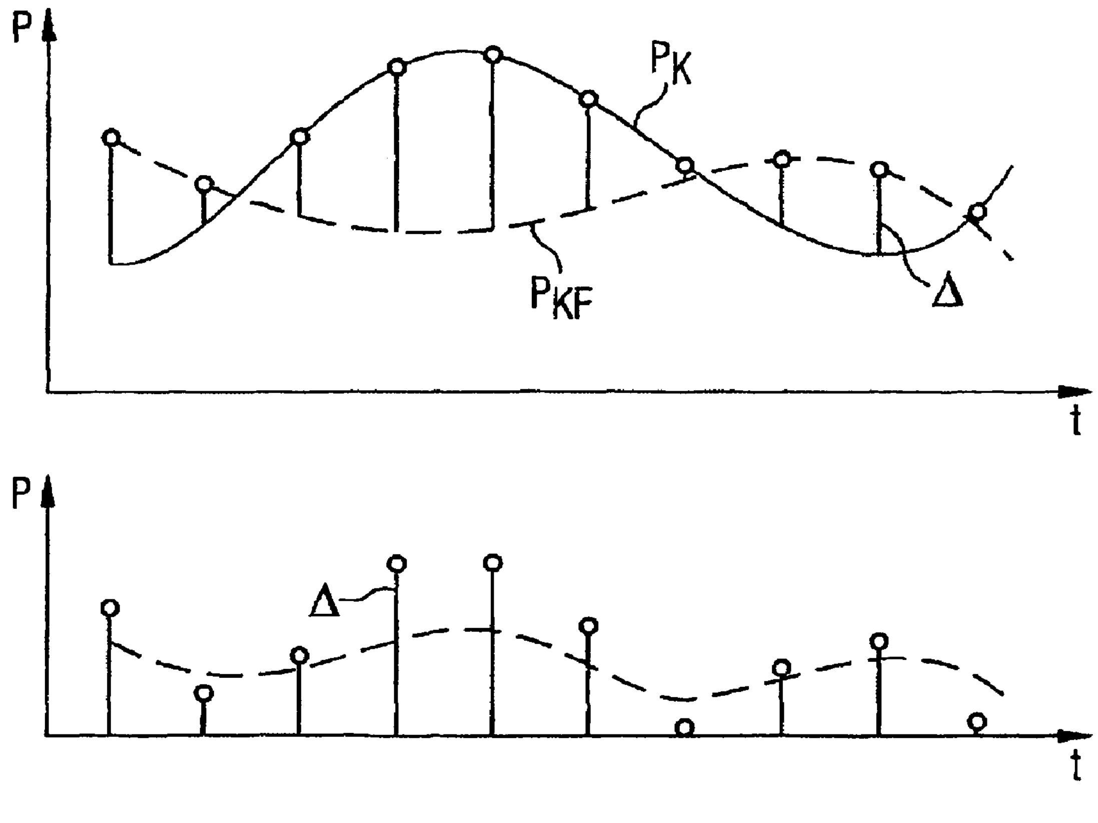
FIG. 3 two diagrams in order to explain the filtering used within the framework of the invention.

FIG. 3 shows two diagrams which explain the filtering used within the framework of the invention. In the top diagram, the fuel pressure is plotted against time. The line $p_k$ symbolizes the pressure course in the fuel accumulator. The line $p_{kf}$ symbolizes a lowpass-filtered pressure course in the fuel accumulator. This lowpass-filtering is preferably undertaken in the electronic control 18, but can also be carried out by other well-known ways and means. The difference Δ is formed between the two curves $p_k$ and $p_{kf}$. The absolute values of this difference Δ are again shown in the bottom diagram in FIG. 3.

By means of this filtering and the formation of differences it is thus possible to obtain a value curve which can be compared with an absolutely selected pressure threshold so that in this way the high-frequency component of the fuel pressure course can be used as criterion for the ratios in the fuel injection system.

Figure 4:
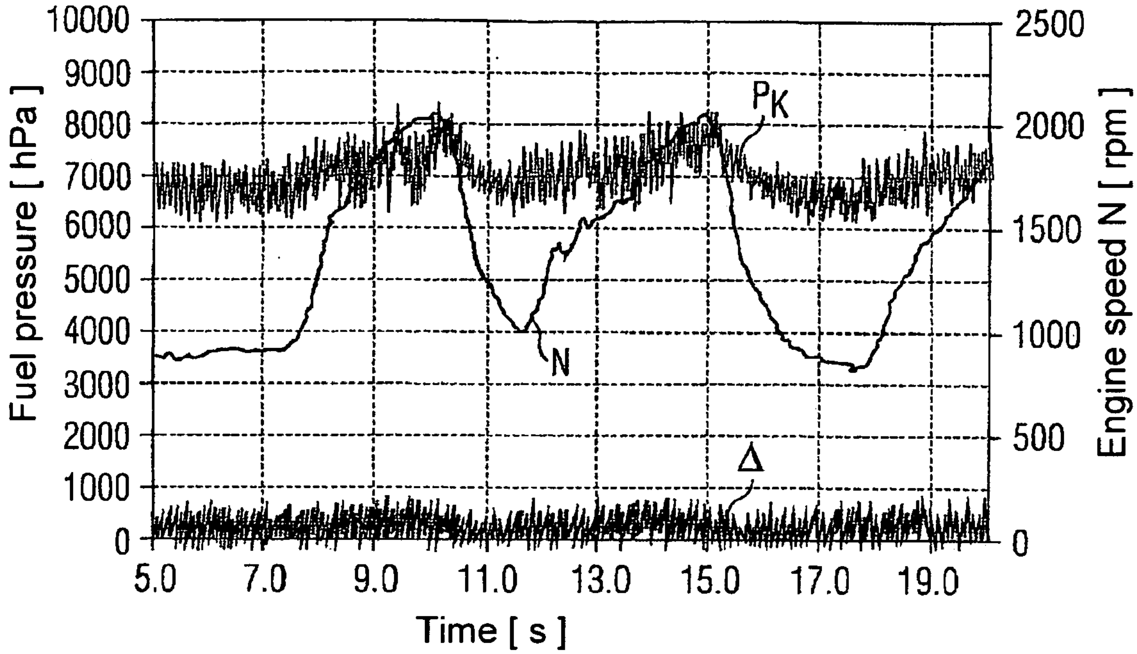
FIG. 4 a measurement diagram which is characteristic of a defect in the fuel pressure control valve.

FIG. 4 shows a measurement diagram which is characteristic of a defect in the fuel pressure control valve. The fact that there is a defect in the fuel injection system can be identified by means of the fact that the fuel pressure $p_k$ in the fuel accumulator is only around 7000 hPa. As a result, low pressure dominates in the rail. However, on the basis of this information alone, it has not yet been indicated whether or not the fault is in the area of the high-pressure pump or in the area of the fuel pressure control valve. This indication is only obtained on the basis of the evaluation described in connection with FIG. 3. By means of the described consecutive lowpass-filtering and formation of differences, a signal curve Δ reflecting the high-frequency component of the fuel pressure course can be obtained. In the present example according to FIG. 4, this high-frequency component Δ is very small and this means that, in the case of a suitably selected threshold value, it is below the said threshold value. This applies both to a high rotational speed and a low rotational speed which is drawn in the diagram in FIG. 4 as a curve N because a defect, in particular mechanical, in the fuel pressure control valve is mainly independent of the load.

Figure 5:
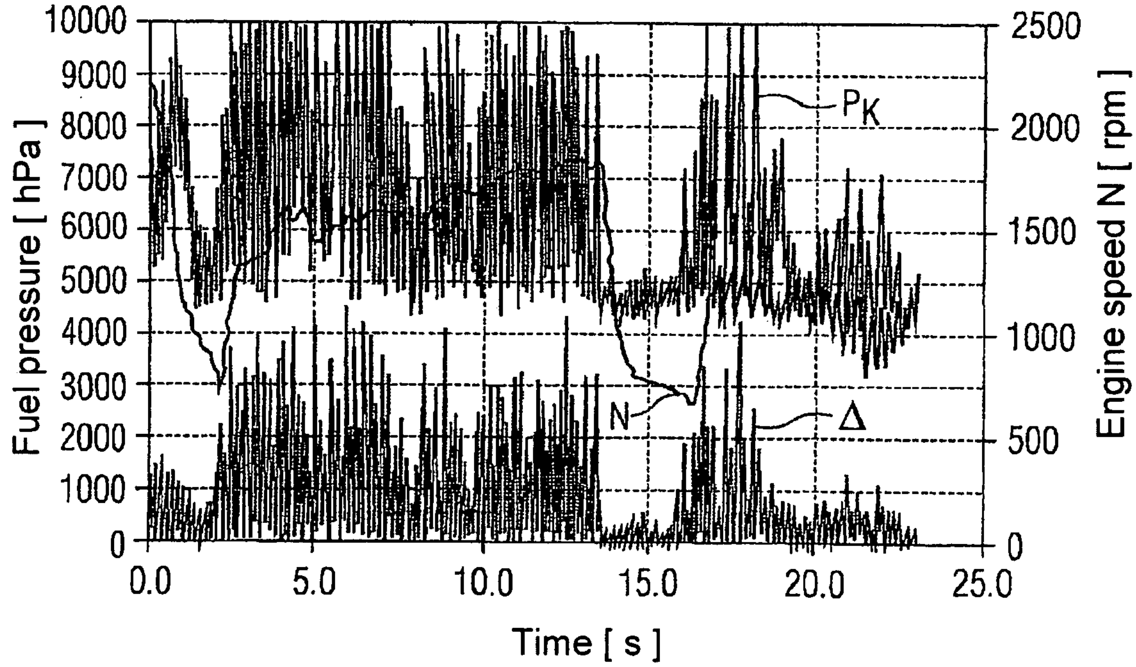
FIG. 5 a measurement diagram which is characteristic of a defect in the high-pressure pump.

FIG. 5 shows a measurement diagram which is characteristic of a defect in the high-pressure pump. The fuel pressure curve $p_K$ shown here has a strong high-frequency component. By means of the filtering method and the formation of differences method described in connection with FIG. 3, the signal curve Δ characterizing the signal of the high-frequency component is filtered out. With a suitably selected threshold value, large parts of this signal curve Δ will be above this threshold value. This makes it possible to conclude that there is a defect in the high-pressure pump, because in particular after the membrane of the high-pressure pump has been torn, considerable high-frequency oscillations are superposed on the fuel pressure signal. In addition, in the diagram according to FIG. 5 it can be identified that the signal Δ, is essentially only under a high load above a suitably selected threshold value so that this can be used as a further decision-making criterion for fault tracing.

Figure 6:
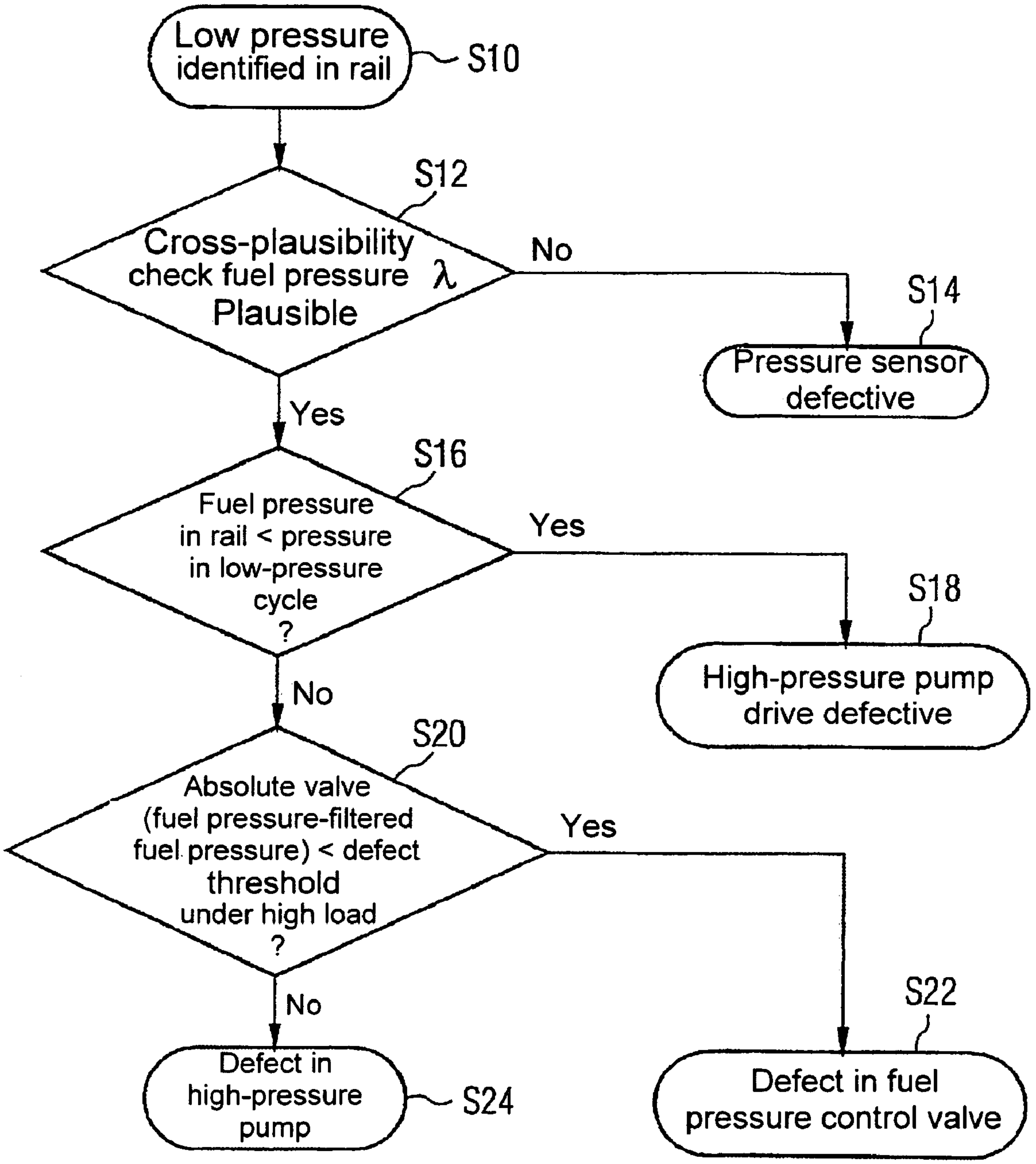
FIG. 6 a flowchart to explain a method according to the invention.

FIG. 6 shows a flowchart which explains a method according to the invention. If it is identified in step S10 that there is a lower pressure in the fuel accumulator, i.e. a low pressure, a cross-plausibility check is then first of all carried out in step S12 between the fuel pressure determined by the pressure sensor and one or several lambda probe values. If it is determined that the lower pressure value is not reflected in the values determined by the lambda probe, it is then concluded according to step S14 that there is a defect in the pressure sensor. However, if there is a plausible behavior with regard to the pressure sensor and the lambda probe, then it is determined in step S16 whether or not the fuel pressure in the fuel accumulator is lower than the pressure in the low-pressure cycle. If this is the case, then it is possible to conclude that there is a defect in the pump drive of the high-pressure pump according to step S18 because the high-pressure pump which is not driven acts as a throttle. Likewise, it could also still be possible to test whether or not the fuel pressure in the rail is lower than a desired pressure in the low-pressure cycle and in this way to conclude that there possibly is a defect in the low-pressure cycle. If it is not determined that there is a defect in the drive in the high-pressure pump, then in step S20 the method switching off the high-frequency component and described on the basis of FIG. 3 and shown in connection with FIG. 4 and FIG. 5 is carried out. Therefore, the absolute value of the difference between the fuel pressure and the lowpass-filtered fuel pressure is compared with a defect threshold value and then particularly under a high load. If this absolute value determined is lower than the defect threshold value then there is a high probability that there is a defect in the fuel pressure control valve according to step S22. On the other hand, i.e. if the defect threshold value is exceeded there is a defect in the high-pressure pump according to step S24.

The invention can be summarized as follows: The invention makes the identification of defects possible in a fuel injection system comprising a fuel accumulator 12, a continuously operating high-pressure pump 10 and a fuel pressure control valve 14. By evaluating the high-frequency component of the fuel pressure course in the fuel accumulator 12, it can be indicated with a high probability which of the components are defective, whereby this is assisted, in particular, by additional evaluations performed during a diagnostic method.

The features of the invention published in this description, on the drawings as well as in the claims can be of significance both individually and in any combination for implementing the invention.

The invention claimed is:

1. A method for identifying defects in a fuel injection system wherein the fuel injection system includes a high-pressure pump, a fuel accumulator, a fuel pressure control valve, and a pressure sensor for recording the pressure prevailing in at least one fuel accumulator, comprising:

identifying the occurrence of at least one defect in the fuel injection system by recording a pressure in the fuel accumulator that is too low and using a high-frequency component of a first signal characterizing the pressure course in the fuel accumulator over a time in order to isolate the source of the defect;

comparing the pressure determined in at least one fuel accumulator with a desired pressure in a low-pressure area of the fuel injection system or a pressure that is actually present in the low-pressure area of the fuel injection system; and concluding that there is a defect in the low-pressure area if the pressure determined in the fuel accumulator is lower than the desired pressure, or concluding that there is a defect in the drive of the high-pressure pump if the pressure determined in the fuel accumulator is lower than the pressure that is actually present in the low-pressure area.

2. The method according to claim 1, wherein the first signal is lowpass-filtered so that a lowpass-filtered second signal is generated, and a third signal is generated as the absolute difference between the first signal and the second signal and the third signal is compared with a predefined threshold value and depending on the comparison, the source of the defect is isolated.

3. The method according to claim 2, wherein it is concluded that there is a defect in the high-pressure pump if the third signal exceeds the predefined threshold value.

4. The method according to claim 2, wherein it is concluded that there is a defect in the fuel pressure control valve if the third signal falls below the predefined threshold value.

5. The method according to claim 1, wherein the pressure determined in the accumulator is evaluated based on a value measured by a lambda probe arranged in the exhaust gas flow of an internal combustion engine assigned to a fuel injection pump and it is concluded that there is a defect in the pressure sensor if a plausibility check is negative.

6. The method according to claim 1, wherein the comparison of the pressure determined in the fuel accumulator with the desired pressure or the pressure that is actually present in the low-pressure area of the fuel injection system takes place before using the high-frequency component of the first signal.

7. The method according to claim 1, wherein the plausibility evaluation for determining the functionality of the pressure sensor is accomplished before the pressure determined in the fuel accumulator is compared with a desired pressure or the pressure that is actually present in a low-pressure area of the fuel injection system.

8. A device for identifying defects in a fuel injection system, the fuel injection system having a high-pressure pump, a fuel accumulator, a fuel pressure control valve, and a pressure sensor for recording the pressure prevailing in the fuel accumulator, wherein the device is adapted to identify defects in the fuel injection system by a method, comprising:

identifying the occurrence of a defect in the fuel injection system by recording a pressure in the fuel accumulator which is too low and use a high-frequency component of a first signal characterizing the pressure course in the fuel accumulator over time in order to isolate the source of the defect;

comparing the pressure determined in the fuel accumulator with a desired pressure in a low-pressure area of the fuel injection system or a pressure that is actually present in the low-pressure area of the fuel injection system; and concluding that there is a defect in the low-pressure area if the pressure determined in the fuel accumulator is lower than the desired pressure, or to conclude that there is a defect in the drive of the high-pressure pump if the pressure determined in the fuel accumulator is lower than the pressure that is actually present in a low-pressure area.

9. A vehicle capable of identifying defects in a fuel injection system, the fuel injection system having a high-pressure pump, a fuel accumulator, a fuel pressure control valve and a pressure sensor for recording the pressure prevailing in the fuel accumulator, wherein the device is adapted to identify defects in the fuel injection system by a method, comprising:

identifying the occurrence of a defect in the fuel injection system by recording a pressure in the fuel accumulator which is too low and use a high-frequency component of a first signal characterizing the pressure course in the fuel accumulator over time in order to isolate the source of the defect;

comparing the pressure determined in the fuel accumulator with a desired pressure in a low-pressure area of the fuel injection system or a pressure that is actually present in the low-pressure area of the fuel injection system; and concluding that there is a defect in the low-pressure area if the pressure determined in the fuel accumulator is lower than the desired pressure, or to conclude that there is a defect in the drive of the high-pressure pump if the pressure determined in the fuel accumulator is lower than the pressure that is actually present in a low-pressure area.

10. A diagnostic unit with a device for identifying defects in a fuel injection system of a vehicle and arranged separately from the motor vehicle, wherein the device is adapted to identify defects in the fuel injection system by a method, comprising;

identifying the occurrence of a defect in the fuel injection system by recording a pressure in the fuel accumulator which is too low and use a high-frequency component of a first signal characterizing the pressure course in the fuel accumulator over time in order to isolate the source of the defect;

comparing the pressure determined in the fuel accumulator with a desired pressure in a low-pressure area of the fuel injection system or a pressure that is actually present in the low-pressure area of the fuel injection system; and concluding that there is a defect in the low-pressure area if the pressure determined in the fuel accumulator is lower than the desired pressure, or to conclude that there is a defect in the drive of the high-pressure pump if the pressure determined in the fuel accumulator is lower than the pressure that is actually present in the low-pressure area.

* * * * *